United States Patent
Dorsch

(10) Patent No.: US 9,604,615 B2
(45) Date of Patent: Mar. 28, 2017

(54) METHOD FOR CARRYING OUT A BRAKING PROCEDURE IN A VEHICLE

(71) Applicant: Robert Bosch GmbH, Stuttgart (DE)

(72) Inventor: Juergen Dorsch, Lauffen-Neckar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/648,617

(22) PCT Filed: Nov. 18, 2013

(86) PCT No.: PCT/EP2013/074025
§ 371 (c)(1),
(2) Date: May 29, 2015

(87) PCT Pub. No.: WO2014/082882
PCT Pub. Date: Jun. 5, 2014

(65) Prior Publication Data
US 2015/0298671 A1    Oct. 22, 2015

(30) Foreign Application Priority Data
Nov. 30, 2012  (DE) .................. 10 2012 221 968

(51) Int. Cl.
*B60T 13/16* (2006.01)
*B60T 8/48* (2006.01)
*B60T 8/44* (2006.01)
*B60T 8/1755* (2006.01)
*B60T 13/14* (2006.01)

(52) U.S. Cl.
CPC .......... *B60T 8/4872* (2013.01); *B60T 8/1755* (2013.01); *B60T 8/442* (2013.01); *B60T 13/14* (2013.01)

(58) Field of Classification Search
CPC .... B60T 8/4872; B60T 8/4063; B60T 8/1755; B60T 8/3685; B60T 8/17636; B60T 7/042; B60T 13/14; B60T 8/442
USPC ...... 303/10, 11, 13, 114.1, 155, 116.1, 116.2, 303/115.1–115.4; 701/1, 29, 36, 45, 70, 701/71, 82, 83, 29.1; 180/197, 271
See application file for complete search history.

(56) References Cited

U.S. PATENT DOCUMENTS

| | | | | |
|---|---|---|---|---|
| 5,048,899 A | * | 9/1991 | Schmitt ................. | B60T 8/4063 180/197 |
| 5,992,952 A | * | 11/1999 | Kubota ............... | B60T 8/17636 303/10 |
| 7,938,493 B2 | * | 5/2011 | Miyazaki .............. | B60T 8/4063 303/11 |
| 8,565,980 B2 | * | 10/2013 | Alford .................. | B60T 8/4872 303/10 |

(Continued)

FOREIGN PATENT DOCUMENTS

| | | |
|---|---|---|
| CN | 101193784 A | 6/2008 |
| CN | 101797918 A | 8/2010 |

(Continued)

*Primary Examiner* — Pamela Rodriguez
(74) *Attorney, Agent, or Firm* — Gerard Messina

(57) ABSTRACT

In a method for carrying out a braking procedure in a vehicle having a hydraulic brake system, when the brake temperature exceeds a boundary value hydraulic fluid is intermediately stored in a storage chamber, and when brake fading occurs the hydraulic fluid is pumped back into the brake circuit.

18 Claims, 2 Drawing Sheets

(56) References Cited

U.S. PATENT DOCUMENTS

| | | | | |
|---|---|---|---|---|
| 2006/0055232 A1* | 3/2006 | Koyama | ............... | B60T 8/3685 |
| | | | | 303/10 |
| 2009/0306871 A1* | 12/2009 | Alford | ................. | B60T 8/4872 |
| | | | | 701/71 |
| 2010/0295363 A1* | 11/2010 | Miyazaki | .............. | B60T 8/4063 |
| | | | | 303/11 |
| 2015/0151729 A1* | 6/2015 | Yamasoe | ................. | B60T 7/042 |
| | | | | 303/122.03 |

FOREIGN PATENT DOCUMENTS

| | | |
|---|---|---|
| CN | 101952151 A | 1/2011 |
| DE | 10 2005 026734 | 12/2006 |
| DE | 10 2009 000577 | 8/2010 |
| WO | 2009/101499 | 8/2009 |
| WO | 2012028700 A1 | 3/2012 |

* cited by examiner

METHOD FOR CARRYING OUT A BRAKING PROCEDURE IN A VEHICLE

FIELD OF THE INVENTION

The present invention is related to a method for carrying out a braking process in a vehicle having a hydraulic braking system.

BACKGROUND INFORMATION

In vehicles having hydraulic brake systems, the problem can occur that as a result of temperature the braking effect is significantly reduced (fading). Depending on the brake temperature, the fading effect can occur to such an extent that, despite a fully depressed brake pedal, adequate braking can no longer be achieved.

SUMMARY OF THE INVENTION

The present invention is based on the object of ensuring adequate braking in a hydraulic braking system of a vehicle even at high brake temperatures.

According to the present invention, this object is achieved by the features described herein. The further descriptions herein indicate further useful developments.

The method according to the present invention for carrying out a braking process can be carried out in vehicles having a hydraulic brake system in which the brake pedal actuation by the driver is converted, in a hydraulically supported manner, into a brake actuation movement at a wheel brake device. The hydraulic brake system has at least one, which may be two, hydraulic brake circuits to each of which at least one, which may be at least two, wheel brake devices are assigned. In at least one hydraulic brake circuit there is situated a storage chamber in which hydraulic fluid from the brake circuit can be accommodated as needed.

If the brake temperature in the brake system exceeds a boundary value, part of the volume of the hydraulic fluid in the brake circuit is intermediately stored in the storage chamber. When brake fading subsequently occurs, the hydraulic fluid accommodated in the storage chamber can be pumped back into the brake circuit. In this way, it is possible to timely counteract a fading behavior of the vehicle brakes at high brake temperature. The brake fluid volume in the storage chamber is applied already during the heating of the wheel brake device, before the occurrence of the fading. As soon as fading occurs, or assumes a significant extent, the volume stored in the storage chamber can be made available as an additional emergency hydraulic volume for additional pressure buildup, by pumping all or part of the volume contained in the storage chamber back into the brake circuit.

The advantage of the embodiment according to the present invention thus consists in the rapid provision of an additional volume of brake fluid in the case of brake fading caused by temperature. The volume in the storage chamber can be pumped back into the brake circuit in a short time. It is not necessary to suction a hydraulic volume in the direction of the brake circuit from a reservoir via a master brake cylinder that is manually loaded during the braking process by the driver's brake pedal.

According to an advantageous embodiment, the storage chamber in which the hydraulic fluid can be intermediately stored is part of an electronic stability system (ESP) in the vehicle that also has a controllable conveyor pump via which hydraulic fluid is pumped from the brake circuit into the storage chamber after the temperature boundary value has been reached. The filling of the storage chamber after the exceeding of the temperature boundary value can take place during a braking process, through a corresponding connection of the hydraulic valves in the brake circuit, i.e. before the occurrence of a significant fading effect. In this way, the hydraulic volume in the storage chamber is available in a timely fashion if the temperature in the vehicle brake climbs further and the fading effect occurs.

In particular for the case in which the storage chamber is part of the ESP system, the storage chamber is advantageously filled only partly with hydraulic fluid from the brake circuit, e.g. with 50% of the storage chamber volume. In this way, it is ensured that the rest of the storage chamber volume is available as a reserve volume, for example in the case of a standard startup of an anti-locking system ABS. The actual purpose of the storage chamber, namely to store hydraulic fluid in the context of an ESP or ABS function, is thus also enabled when the method according to the present invention is carried out. On the other hand, the reduced hydraulic fluid volume held in the storage chamber is sufficient to increase the brake pressure in the brake circuit when there is a higher brake temperature, and in this way to counteract the fading.

According to a further useful embodiment, the hydraulic fluid accommodated in the storage chamber is also pumped back into the brake circuit in the case in which no brake fading occurs, if the brake temperature decreases again and falls below a boundary value. This second temperature boundary value is advantageously lower than the first temperature boundary value upon whose exceeding the hydraulic fluid is pumped into the storage chamber. In this way, it is ensured that the total volume of brake fluid is again available in the brake circuit when the brake temperature again reaches a normal range in which there is no longer any danger of brake fading due to temperature. The first temperature boundary value upon whose exceeding hydraulic fluid is pumped into the storage chamber is for example 400° C., and the second, lower temperature boundary value, such that the hydraulic fluid is pumped back again when the temperature falls below this value, is for example 250° C. The first, higher temperature boundary value still has some distance from the temperature beginning from which a significant fading can be expected; this temperature is for example 600° C. The brake temperature here relates to the temperature of the brake disk or the brake lining.

According to a further useful embodiment, the brake temperature can be estimated from the hydraulic brake pressure in the brake circuit and the wheel speeds of the vehicle. This procedure has the advantage that sensor data, such as brake pressure and wheel speeds, can be used that are standardly already available in the vehicle, for example from an electronic stability program (ESP system). It is thus not necessarily required to measure the brake temperature, even if it is possible to carry this out. In the estimation of the brake temperature, a relation between the hydraulic brake pressure and the wheel speeds is assumed as a basis.

Further advantages and useful embodiments may be learned from the further claims, the description of the Figures, and the drawings.

DETAILED DESCRIPTION

Figure 1:
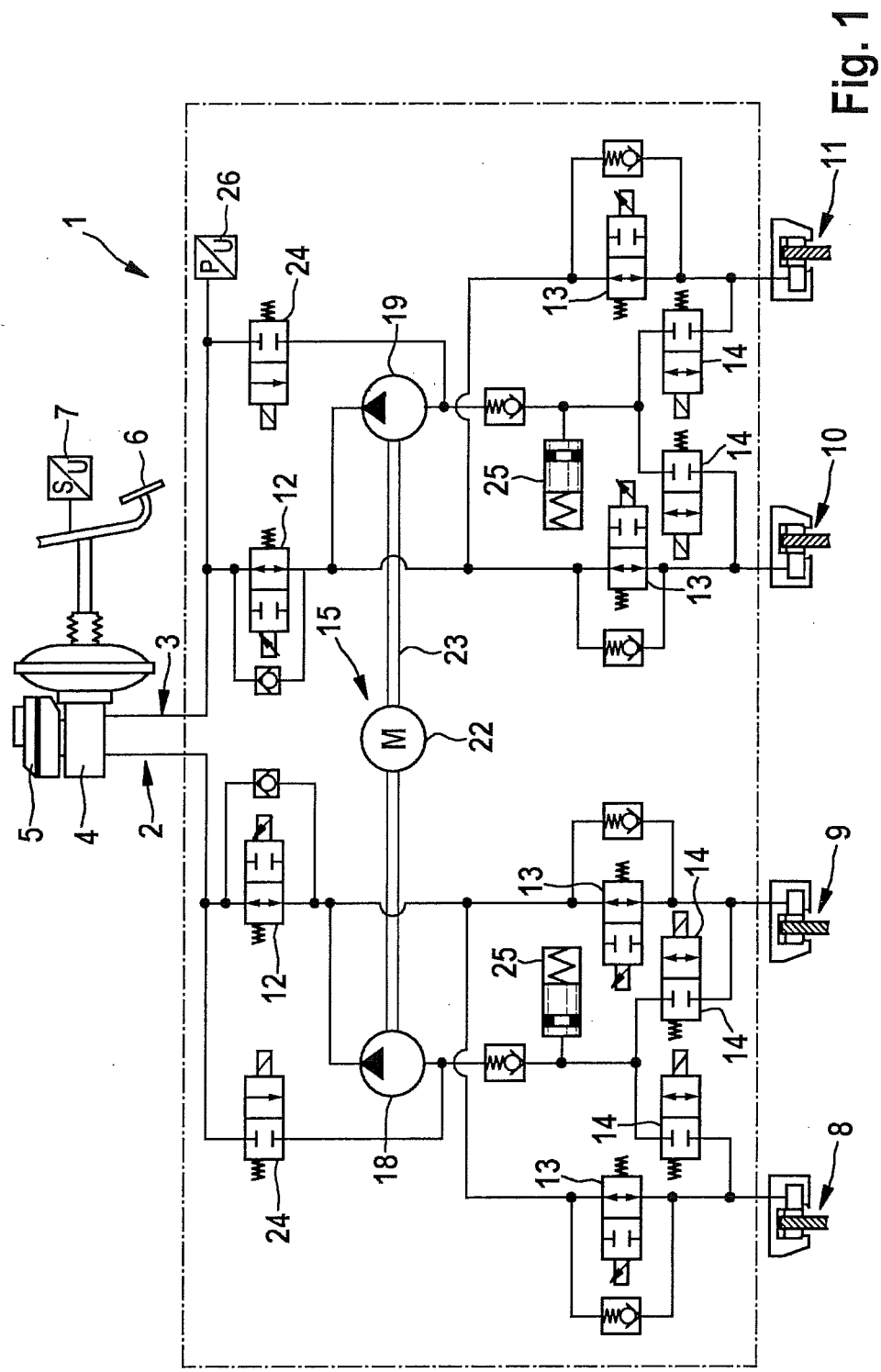
FIG. 1 shows a hydraulic circuit plan of a vehicle brake having two brake circuits, assigned to the front axle and to the rear axle, and having an electronic stability program ESP.

The hydraulic brake system, shown in a hydraulic circuit plan according to FIG. 1, in a brake system 1 has a front axle brake circuit 2 and a rear axle brake circuit 3 for supplying hydraulic brake fluid to wheel braking devices 8 and 9 at the front wheels, or, respectively, to wheel brake devices 10 and 11 at the rear wheels. In principle, the present invention also applies to brake systems in which the brake circuit partitioning is diagonal, so that, per brake circuit, one wheel brake device at a front wheel and one at a rear wheel is provided.

The two brake circuits 2, 3 are connected to a common master brake cylinder 4 that is supplied with brake fluid via a brake fluid reservoir 5. Master brake cylinder 4 is actuated by the driver via brake pedal 6, and the pedal path exerted by the driver is measured by a pedal path sensor 7.

In each brake circuit 2, 3, a changeover valve 12 is situated in the flow path between the master brake cylinder and the respective wheel brake devices 8 and 9, or 10 and 11. Changeover valves 12 are open in their basic position, where no flow is present. A check valve connected in parallel, through which flow can take place in the direction of the respective wheel brake devices, is allocated to each changeover valve.

Between changeover valves 12 and the respective wheel brake devices 8, 9, or 10, 11, there are situated inlet valves 13 that are also open when there is no flow, and to which check valves are allocated through which flow can take place in the opposite direction, i.e. from the wheel brake devices in the direction to the master brake cylinder.

To each wheel brake device 8, 9, or 10, 11, there is allocated an outlet valve 14 that is closed when there is no flow. Outlet valves 14 are each connected to the intake side of a pump unit 15 that has a conveyor pump 18 or 19 in each brake circuit 2, 3. The pump unit has allocated to it an electrical drive for pump motor 22, which actuates the two conveyor pumps 18 and 19 via a shaft 23. The pressure side of conveyor pump 18 or 19 is connected to a line segment between changeover valve 12 and the two inlet valves 13 per brake circuit.

The intake sides of conveyor pumps 18 and 19 are each connected to a high-pressure switching valve 24 that is hydraulically connected to master brake cylinder 4. When there is a regulating intervention relating to driving dynamics, for a rapid buildup of brake pressure high-pressure switching valves 24, which are closed in the state without flow, can be opened, so that conveyor pumps 18 and 19 suction hydraulic fluid immediately from master brake cylinder 4. This buildup of brake pressure can be carried out independent of an actuation of the braking system by the driver. Pump unit 15, having the two conveyor pumps 18 and 19, electrical pump motor 22, and shaft 23, is part of a driver assistance system, and is a component of an electronic stability program (ESP).

Between outlet valves 14 and the intake side of conveyor pumps 18 and 19 there is situated, per brake circuit 2, 3, a storage chamber 25 that is used for the intermediate storage of brake fluid, which fluid is let out from wheel brake devices 8, 9, or 10, 11, through outlet valves 14 during a driving intervention. To each storage chamber 25 there is allocated a check valve that opens in the direction of the intake sides of conveyor pumps 18, 19. Storage chambers 25 are also part of the electronic stability program (ESP).

For the pressure measurement, a pressure sensor 26 is situated in brake circuit 3, adjacent to master brake cylinder 4.

In addition to its original function of modulating the brake pressure in emergency situations in such a way that the vehicle remains stable, the ESP system in the brake system can also be used for improved braking action when there is a high brake temperature. For this purpose, as soon as the brake temperature, i.e. the temperature of the brake disk or of the brake lining, exceeds an upper boundary value, a partial volume of the hydraulic fluid is pumped into storage chambers 25 of brake circuits 2, 3. This upper temperature boundary value is still below the temperature at which significant fading occurs. As soon as such fading has been determined, the hydraulic fluid is subsequently pumped from storage chamber 25 back into the respective brake circuit 2, 3, the hydraulic pressure is increased, and the fading is counteracted.

Figure 2:
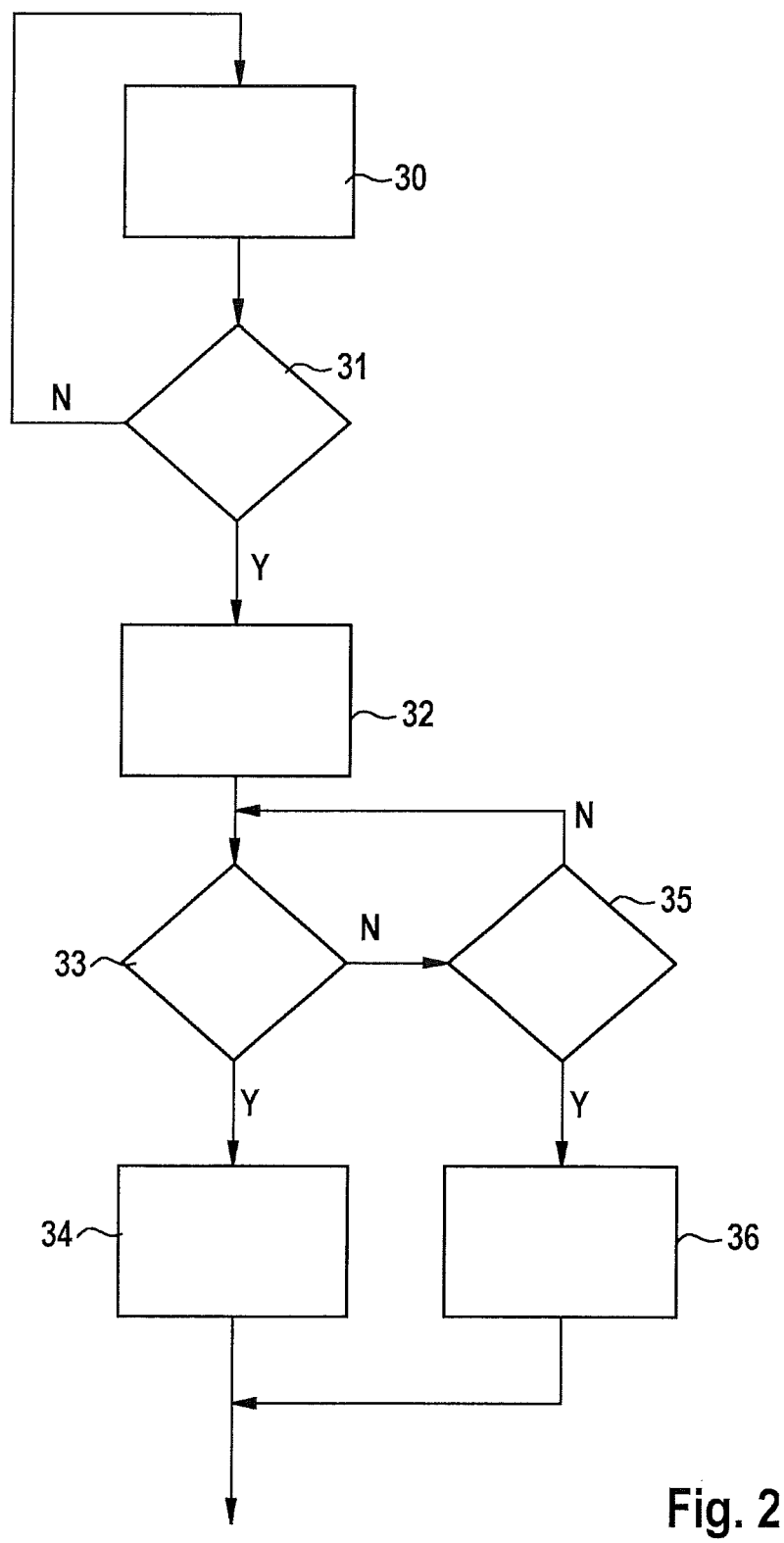
FIG. 2 shows a schematic diagram having individual method steps for carrying out a braking procedure in the case of brake fading.

FIG. 2 shows a flow diagram indicating the various method steps for carrying out the braking procedure in the case of high brake temperature. First, in a first method step 30 the brake temperature is determined. This may take on the basis of values, determined by sensors, of the hydraulic brake pressure and of the wheel speeds. In the next method step 31 it is checked whether the brake temperature exceeds a first upper temperature boundary value, which for example is 400° C. If this is the case, the yes branch ("Y") is taken to next method step 32; otherwise, the no branch ("N") is followed back to the beginning of the method, and the temperature is again determined at cyclical intervals.

If the brake temperature has exceeded the allocated brake value, then in method step 32 a part of the hydraulic fluid in each brake circuit is pumped into the respectively allocated storage chamber, which is part of the ESP system. The volume of the hydraulic fluid pumped into the storage chamber is smaller than the maximum storage chamber volume, so that the storage chamber is not completely filled, but is only partially filled. This makes it possible to use the storage chamber as a reserve volume in the case of an ABS standard startup, corresponding to its original function.

In the following method step 33, it is queried whether brake fading is present. This can also be determined for example on the basis of the brake temperature. If the brake temperature is significantly higher than the upper temperature boundary value, which in method step 31 or 32 was taken as a basis for the pumping of brake fluid into the storage chamber, then an elastic expansion, caused by temperature, of the wheel brake device can be assumed, which is accompanied by fading if it is simultaneously recognized that the vehicle deceleration, determined for example via wheel speed sensors, is inadequate for the corresponding brake pressure. The critical temperature at which brake fading is to be expected is for example 600° C.

If in method step 33 it is determined that fading is present, the method continues, following the yes branch, to the next method step 34, in which the brake fluid is pumped from the storage chamber back into the respective brake circuit. In this way, an increased hydraulic volume and increased hydraulic pressure are again provided in the brake circuit, and in this way the fading is at least partially compensated.

If in contrast the query in method step 33 yields the result that no, or no significant, fading is present, then the no branch is followed to method step 35, in which, in a further query, it is checked whether the brake temperature has again fallen below a lower temperature boundary value. This lower temperature boundary value is significantly lower than the upper temperature boundary value that, in method steps 31 and 32, results in pumping of the hydraulic fluid into the storage chamber; for example, the lower temperature boundary value in method step 35 is 250° C.

If the query in method step 35 yields the result that the temperature has not yet fallen below the lower temperature boundary value, then, following the no branch, the method returns to the beginning of the query according to method step 33, and a check is again made at regular cyclical intervals for the presence of fading. If, in contrast, the query yields the result that the temperature has fallen below the lower temperature boundary value, then the yes branch is followed to the next method step 36, in which the storage chamber is emptied, in the context of a procedure differing from method step 34, and the hydraulic fluid is led back into the respective brake circuit. The emptying of the storage chamber according to method step 36 takes place in particular in a manner such that a braking procedure that is taking place is not influenced.

What is claimed is:

1. A method for carrying out a braking procedure in a vehicle having a hydraulic brake system, the method comprising:
   intermediately storing, when a brake temperature exceeds a first boundary value, a partial volume of hydraulic fluid in a brake circuit in a storage chamber;
   pumping back, when the brake temperature exceeds a brake fading boundary value, the hydraulic fluid accommodated in the storage chamber into the brake circuit; and
   pumping back, when the brake temperature is less than a second boundary value, the hydraulic fluid accommodated in the storage chamber into the brake circuit;
   wherein the first boundary value is less than the brake fading boundary value.

2. The method of claim 1, wherein the storage chamber is filled only partly with hydraulic fluid from the brake circuit.

3. The method of claim 1, wherein the storage chamber, together with an allocated pump, is a component of a driver assistance system.

4. The method of claim 1, wherein the brake temperature is estimated from the hydraulic brake pressure and the wheel speeds of the vehicle.

5. The method of claim 1, wherein the storage chamber, together with an allocated pump, is a component of a driver assistance system, which includes an electronic stability program (ESP).

6. The method of claim 1, wherein pumping the hydraulic fluid accommodated in the storage chamber back into the brake circuit when the brake temperature decreases below the second boundary value does not influence a braking action of the brake circuit.

7. The method of claim 1, wherein the second boundary value is less than the first boundary value.

8. The method of claim 1, wherein the first boundary value is 400° C., the second boundary value is 250° C., and the brake fading boundary value is 600° C.

9. A regulating or control device for carrying out a braking procedure in a vehicle having a hydraulic brake system, comprising:
   a control unit for performing the following:
   intermediately storing, when a brake temperature exceeds a first boundary value, a partial volume of hydraulic fluid in a brake circuit in a storage chamber;
   pumping back, when the brake temperature exceeds a brake fading boundary value, the hydraulic fluid accommodated in the storage chamber into the brake circuit; and
   pumping back, when the brake temperature is less than a second boundary value, the hydraulic fluid accommodated in the storage chamber into the brake circuit;
   wherein the first boundary value is less than the brake fading boundary value.

10. The device of claim 9, wherein the second boundary value is less than the first boundary value.

11. The device of claim 9, wherein the first boundary value is 400° C., the second boundary value is 250° C., and the brake fading boundary value is 600° C.

12. A driver assistance system in a vehicle, comprising:
   an electronic stability program (ESP) having a regulating or control device;
   wherein the regulating or control device includes a control unit for performing the following:
   intermediately storing, when a brake temperature exceeds a first boundary value, a partial volume of hydraulic fluid in a brake circuit in a storage chamber;
   pumping back, when the brake temperature exceeds a brake fading boundary value, the hydraulic fluid accommodated in the storage chamber into the brake circuit; and
   pumping back, when the brake temperature is less than a second boundary value, the hydraulic fluid accommodated in the storage chamber into the brake circuit;
   wherein the first boundary value is less than the brake fading boundary value.

13. The system of claim 12, wherein the second boundary value is less than the first boundary value.

14. The system of claim 12, wherein the first boundary value is 400° C., the second boundary value is 250° C., and the brake fading boundary value is 600° C.

15. A hydraulic brake system in a vehicle, comprising:
   a regulating or control device for carrying out a braking procedure in a vehicle having the hydraulic brake system, including a control unit for performing the following:
   intermediately storing, when a brake temperature exceeds a first boundary value, a partial volume of hydraulic fluid in a brake circuit in a storage chamber;
   pumping back, when the brake temperature exceeds a brake fading boundary value, the hydraulic fluid accommodated in the storage chamber into the brake circuit; and
   pumping back, when the brake temperature is less than a second boundary value, the hydraulic fluid accommodated in the storage chamber into the brake circuit;
   wherein the first boundary value is less than the brake fading boundary value;
   and
   a pump allocated to the storage chamber.

16. The brake system of claim 15, wherein one storage chamber is provided per brake circuit in the hydraulic brake system.

17. The system of claim 15, wherein the second boundary value is less than the first boundary value.

18. The system of claim 15, wherein the first boundary value is 400° C., the second boundary value is 250° C., and the brake fading boundary value is 600° C.

* * * * *